United States Patent
Hsu et al.

(10) Patent No.: US 12,449,817 B2
(45) Date of Patent: Oct. 21, 2025

(54) HEADING AND ATTITUDE CORRECTION METHOD AND HEADING AND ATTITUDE CORRECTION SYSTEM

(71) Applicant: AUDEN TECHNO CORP., Taoyuan (TW)

(72) Inventors: Yung-Tai Hsu, Taoyuan (TW); Chun-Heng Chao, Taoyuan (TW); Yen-Wei Wang, Taoyuan (TW); Bo-Yu Zhu, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 353 days.

(21) Appl. No.: 18/064,999

(22) Filed: Dec. 13, 2022

(65) Prior Publication Data
US 2024/0192692 A1 Jun. 13, 2024

(51) Int. Cl.
G05D 1/00 (2024.01)
G06F 17/18 (2006.01)

(52) U.S. Cl.
CPC ........... G05D 1/0891 (2013.01); G06F 17/18 (2013.01)

(58) Field of Classification Search
CPC .............................. G05D 1/0891; G06F 17/18
USPC ........................................................... 701/1
See application file for complete search history.

(56) References Cited

U.S. PATENT DOCUMENTS

| | | | | |
|---|---|---|---|---|
| 5,757,316 A | * | 5/1998 | Buchler | G01S 19/55 701/470 |
| 7,216,055 B1 | * | 5/2007 | Horton | G01C 21/183 702/153 |
| 7,418,364 B1 | * | 8/2008 | Horton | G01C 21/188 702/153 |

(Continued)

FOREIGN PATENT DOCUMENTS

| | | | | |
|---|---|---|---|---|
| CN | 104374388 B | * | 4/2017 | G01C 21/12 |
| CN | 107313766 A | * | 11/2017 | E21B 47/02 |

(Continued)

OTHER PUBLICATIONS

Abd-Elmotaal, H. A., and Atef Makhloof. "Gross-errors detection in the shipborne gravity data set for Africa." Geodetic Week, Essen, Germany (2013): 8-10. (Year: 2013).*

(Continued)

*Primary Examiner* — Matthias S Weisfeld
*Assistant Examiner* — Keith A von Volkenburg
(74) *Attorney, Agent, or Firm* — &Cai Intellectual Property (USA) Office

(57) ABSTRACT

A heading and attitude correction method and a heading and attitude correction system are provided. The method includes: obtaining attitude data in a period of time; performing a linear regression analysis on the attitude data and time points in the time period to obtain a regression line and a standard deviation; obtaining a deviation value between the attitude data and the regression line at each of the time points; excluding the attitude data for which the deviation value is greater than or equal to at least twice the standard (Continued)

deviation; grouping the attitude data according to a grouping value to form clusters; comparing a total quantity of the attitude data in each of the clusters, and defining one of the clusters with a largest total quantity as an ideal cluster; and calculating an average of the attitude data in the ideal cluster as a reasonable attitude data.

4 Claims, 4 Drawing Sheets

(56) References Cited

U.S. PATENT DOCUMENTS

| | | | | |
|---|---|---|---|---|
| 11,348,340 | B1 * | 5/2022 | Sheng | G06V 20/58 |
| 11,467,606 | B1 * | 10/2022 | Wiegman | B64C 13/0421 |
| 11,482,118 | B1 * | 10/2022 | Nealy | G08G 5/30 |
| 2018/0157255 | A1 * | 6/2018 | Halverson | G05D 1/0055 |
| 2018/0365772 | A1 * | 12/2018 | Thompson | G06Q 50/40 |
| 2022/0326704 | A1 * | 10/2022 | Moy | G05D 1/0055 |
| 2022/0371724 | A1 * | 11/2022 | Giroux | G05D 1/0088 |

FOREIGN PATENT DOCUMENTS

| | | | | | |
|---|---|---|---|---|---|
| CN | 109001787 | A | * | 12/2018 | G01C 21/165 |
| CN | 108731676 | B | * | 6/2021 | G01C 21/18 |
| CN | 115096336 | A | * | 9/2022 | |
| JP | 2017106919 | A | * | 6/2017 | F41G 7/36 |

OTHER PUBLICATIONS

Illowsky, B., & Dean, S. (n.d.). 12.5 outliers—statistics. OpenStax. https://openstax.org/books/statistics/pages/12-5-outliers (Year: 2020).*

* cited by examiner

HEADING AND ATTITUDE CORRECTION METHOD AND HEADING AND ATTITUDE CORRECTION SYSTEM

FIELD OF THE DISCLOSURE

The present disclosure relates to a correction method and a correction system, and more particularly to a heading and attitude correction method and a heading and attitude correction system.

BACKGROUND OF THE DISCLOSURE

In electronically-driven array antennas, when a driving device (e.g., a motor device) fails and an attitude of the array antenna cannot be changed, the array antenna must obtain relevant parameters through a heading and attitude reference system, so as to change a direction of a beam from the array antenna to communicate with a satellite in different attitudes.

However, an axial sensor of a conventional heading and attitude reference system is susceptible to environmental interference during operation, resulting in inaccurate measurement values. When the values measured by the heading and attitude reference system are inaccurate, an efficiency of the antenna beam tracking of the array antenna will be greatly reduced.

SUMMARY OF THE DISCLOSURE

In response to the above-referenced technical inadequacy, the present disclosure provides a heading and attitude correction method and a heading and attitude correction system.

In one aspect, the present disclosure provides a heading and attitude correction method. The method includes: obtaining a plurality of attitude data in any one of axial directions in a period of time from an axial sensor; performing a linear regression analysis on the attitude data and a plurality of time points in the time period to obtain a regression line and a standard deviation; obtaining a deviation value between the attitude data and the regression line at each of the time points; excluding the attitude data for which the deviation value is greater than or equal to at least twice the standard deviation; grouping the attitude data according to a grouping value to form a plurality of clusters; comparing a total quantity of the attitude data in each of the clusters, and defining one of the clusters with a largest total quantity as an ideal cluster; and calculating an average of the attitude data in the ideal cluster as a reasonable attitude data after correction.

In certain embodiments, the grouping value is a minimum accuracy of the axial sensor of the heading and attitude correction system.

In another aspect, the present disclosure provides a heading and attitude correction system. The heading and attitude correction system includes an axial sensor and a calibration module. The axial sensor is configured to sense an attitude of a vehicle to generate a plurality of attitude data in any one of axial directions. The calibration module is electrically coupled to the axial sensor and executes a heading and attitude correction method. The heading and attitude correction method includes: performing a linear regression analysis on the attitude data and a plurality of time points in the time period to obtain a regression line and a standard deviation; obtaining a deviation value between the attitude data and the regression line at each of the time points; excluding the attitude data for which the deviation value is greater than or equal to at least twice the standard deviation; grouping the attitude data according to a grouping value to form a plurality of clusters; comparing a total quantity of the attitude data in each of the clusters, and defining one of the clusters with a largest total quantity as an ideal cluster; and calculating an average of the attitude data in the ideal cluster as a reasonable attitude data after correction.

In certain embodiments, the grouping value is a minimum accuracy of the axial sensor of the heading and attitude correction system.

Therefore, in the heading and attitude correction method and the heading and attitude correction system provided by the present disclosure, by virtue of "excluding the attitude data for which the deviation value is greater than or equal to at least twice the standard deviation, and grouping the attitude data according to a grouping value to form a plurality of clusters," and "defining one of the clusters with a largest total quantity as an ideal cluster, and calculating an average of the attitude data in the ideal cluster as a reasonable attitude data after correction," the heading and attitude correction method and the heading and attitude correction system can correct parameters, thereby ensuring an efficiency of antenna beam tracking.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
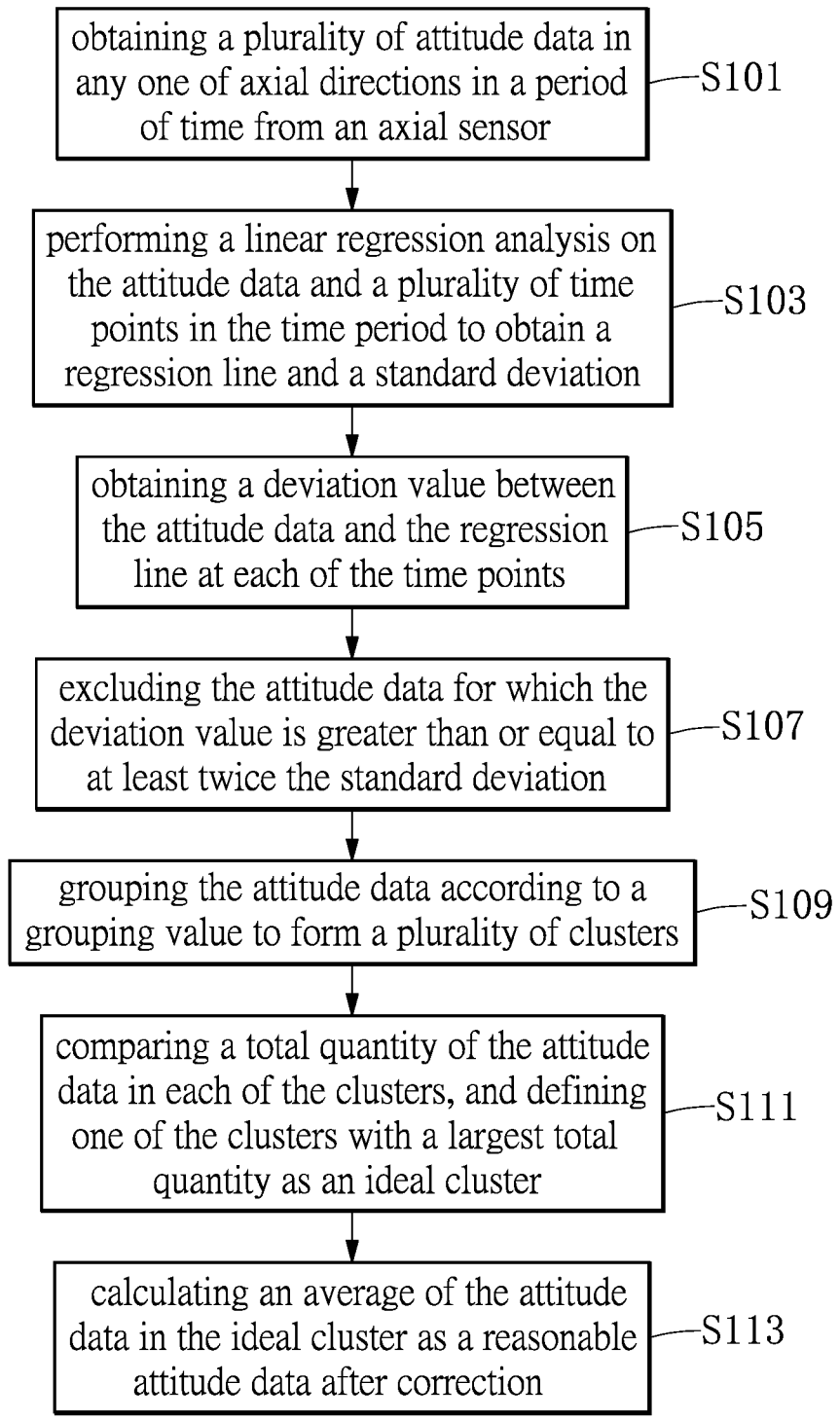
FIG. 1 is a flowchart of a heading and attitude correction method according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, the present disclosure provides a heading and attitude correction method and a heading and attitude correction system 100. The heading and attitude correction method is applicable to the heading and attitude correction system 100. In the following description, each component of the heading and attitude correction system 100 are first introduced, and then the implementation of the correction method by each component of the heading and attitude correction system 100 is specified.

Figure 2:
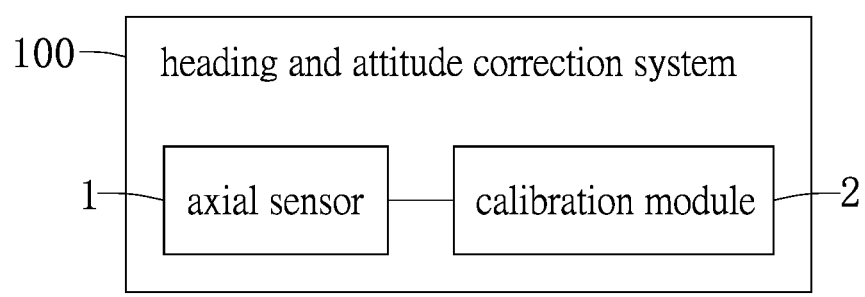
FIG. 2 is a circuit block diagram of a heading and attitude correction system according to the present disclosure.

Referring to FIG. 2, the heading and attitude correction system 100 includes an axial sensor 1 and a calibration module 2 that is electrically coupled to the axial sensor. The axial sensor 1 is configured to sense an attitude of a vehicle (not shown) to generate a plurality of attitude data in any one of axial directions. In practice, the axial sensor 1 can be, for example, a nine-axis electronic sensing device with a three-axis accelerometer, a three-axis gyroscope, and a three-axis magnetometer, and the axial sensor 1 can be used to sense an attitude of the vehicle (e.g., a pitch angle, a roll angle, or a yaw angle), but the present disclosure is not limited thereto.

Furthermore, as shown in FIG. 2, the calibration module 2 in the present embodiment may be an electronic device with computing functions (e.g., a CPU, an MCU, or an ECU), and the calibration module 2 can execute the correction method for correcting an error parameter generated by the axial sensor 1. The calibration method includes a plurality of steps S101~S113. It should be noted that, any one of the above-mentioned steps can be omitted or adjusted within reason according to practical requirements.

The step S101 is implemented by obtaining a plurality of attitude data in any one of axial directions in a period of time from an axial sensor 1. For example, one of the axial directions may be the pitch angle, and each of the attitude data is an attitude state at different time points.

The step S103 is implemented by performing a linear regression analysis on the attitude data and a plurality of time points in the time period to obtain a regression line and a standard deviation.

The step S105 is implemented by obtaining a deviation value between the attitude data and the regression line at each of the time points. The deviation value can be understood as the residual between the attitude data and the regression line at the same time point.

The step S107 is implemented by excluding the attitude data for which the deviation value is greater than or equal to at least twice the standard deviation. The attitude data to be excluded may preferably be greater than or equal to three times the standard deviation.

The step S109 is implemented by grouping the attitude data according to a grouping value to form a plurality of clusters. The grouping value can be any value selected according to current circumstances. In practice, the grouping value may preferably be a minimum accuracy of the axial sensor 1.

The step S111 is implemented by comparing a total quantity of the attitude data in each of the clusters, and defining one of the clusters with a largest total quantity as an ideal cluster.

The step S113 is implemented by calculating an average of the attitude data in the ideal cluster as a reasonable attitude data after correction. That is to say, the reasonable attitude data is used to replace the attitude data currently measured by the axial sensor 1.

For the convenience of description, an example will be provided below for explaining the steps S101~S113, but the present disclosure is not limited thereto.

Figure 3:
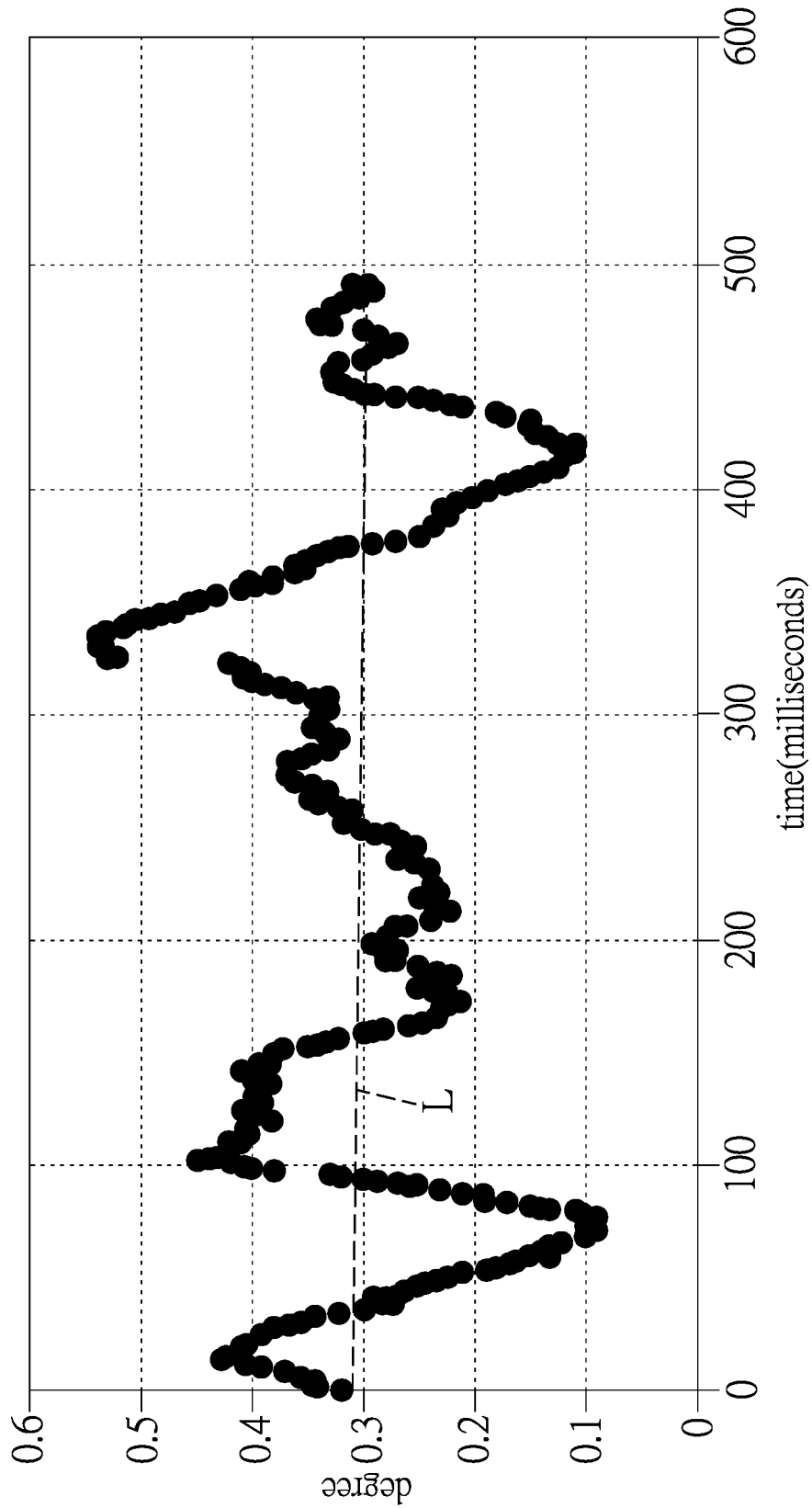
FIG. 3 is a schematic diagram of a relationship between time and pitch angles measured by an axial sensor according to the present disclosure.
Figure 4:
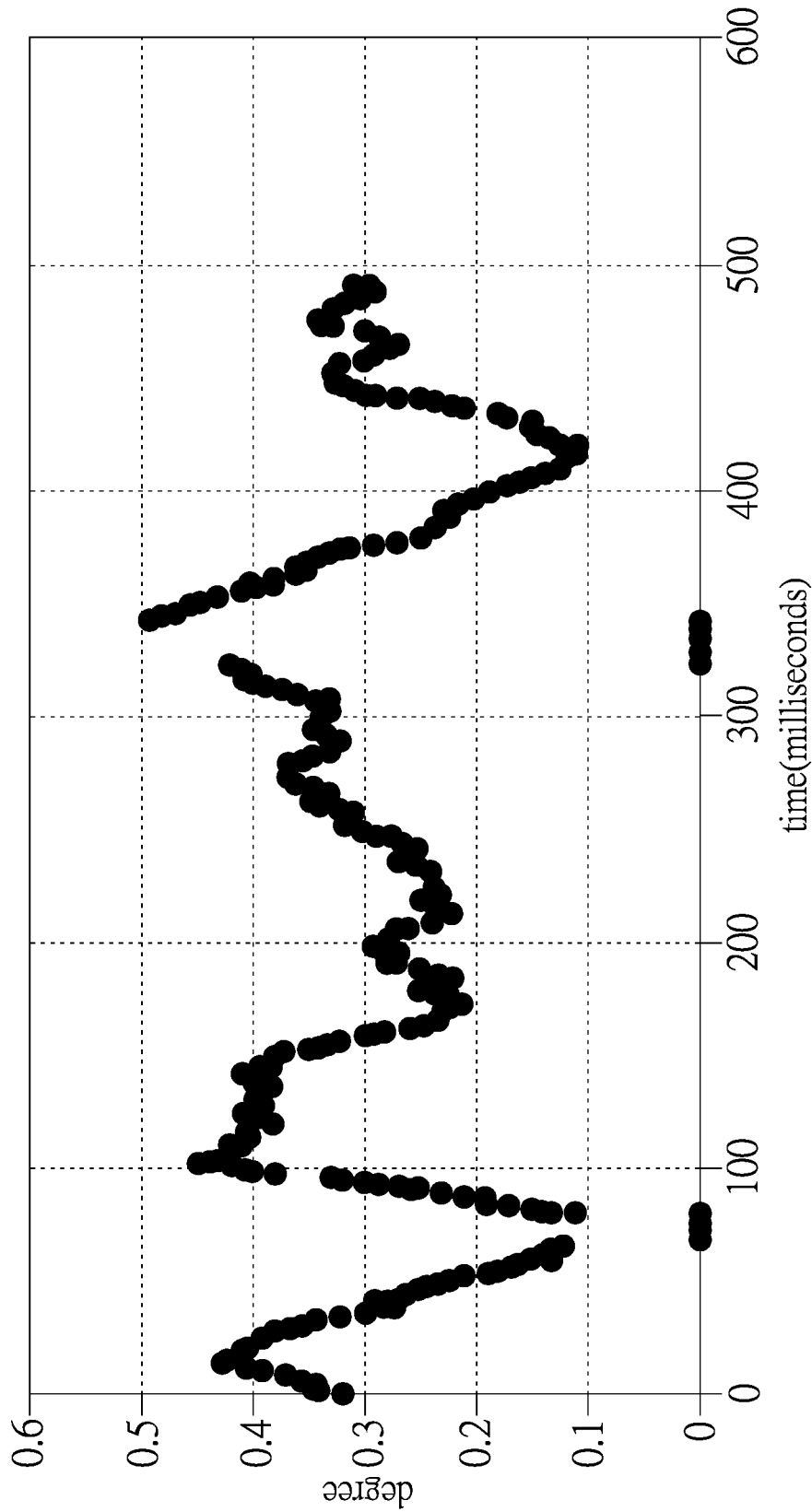
FIG. 4 is a schematic diagram of FIG. 3 when attitude data whose deviation value is greater than or equal to at least twice the standard deviation is excluded.

Referring to FIG. 3, FIG. 3 is a schematic diagram of a relationship between times and pitch angles, a horizontal axis of the schematic diagram is time (e.g., milliseconds), and a vertical axis of the schematic diagram is the pitch angle (i.e., the attitude data). A regression line L and a standard deviation can be obtained from the time and attitude data in FIG. 3 through linear regression analysis. The equation of the regression line L is $y=-3\times10^{-5}x+0.3083$, and the standard deviation is about 0.1.

The calibration module 2 compares (at each of the time points) a deviation value (i.e., a difference, or a residual) between the attitude data and the regression line. The correction module 2 excludes the attitude data whose deviation value is greater than or equal to at least twice the standard deviation. For example, at the 100th millisecond, a value of the regression line is 0.3053 (degrees), and the attitude data measured by the axial sensor 1 is 0.09 (degrees). Therefore, the attitude data at the 100th millisecond clearly exceeds twice the standard deviation (0.3053-0.09≥2×0.1) and is excluded (i.e., the data with a pitch angle of zero in FIG. 4).

Then, the calibration module 2 groups the attitude data according to a grouping value to form a plurality of clusters. The grouping value is an example of the minimum accuracy of the axial sensor 1, and the grouping value is 0.1. The attitude data are classified into a cluster within a range from 0.1 to 0.2, a cluster within a range from 0.2 to 0.3, a cluster within a range from 0.3 to 0.4, and a cluster within a range from 0.4 to 0.5.

The calibration module 2 compares the total quantity of the attitude data in each of the clusters (see Table 1 below) and defines one of the clusters with the largest total quantity as an ideal cluster, that is, the attitude data with degrees of 0.3 to 0.4 belong to the ideal cluster. The correction module 2 calculates an average number (i.e., 0.35 degrees) of the attitude data in the ideal cluster as a reasonable attitude data after correction.

TABLE 1

| Cluster (degree) | A quantity of attitude data | Sum of attitude data | Average (degree) |
|---|---|---|---|
| 0.4~0.5 | 73 | 30.65 | 0.42 |
| 0.3~0.4 | 192 | 67.16 | 0.35 |
| 0.2~0.3 | 171 | 43.42 | 0.25 |
| 0.1~0.2 | 61 | 9 | 0.14 |

It should be noted that while the actual average value of the attitude data (i.e., all the attitude data) with degrees of 0.1 to 0.5 is 0.30, the actual pitch angle of the vehicle is in fact closer to 0.35 degrees. That is to say, the heading and attitude correction method and the heading and attitude correction system in the present disclosure can indeed reduce errors effectively.

Beneficial Effects of the Embodiment

In conclusion, in the heading and attitude correction method and the heading and attitude correction system provided by the present disclosure, by virtue of "excluding the attitude data for which the deviation value is greater than or equal to at least twice the standard deviation, and grouping the attitude data according to a grouping value to form a plurality of clusters," and "defining one of the clusters with a largest total quantity as an ideal cluster, and calculating an average of the attitude data in the ideal cluster as a reasonable attitude data after correction," the heading and attitude correction method and the heading and attitude correction system can correct parameters, thereby ensuring an efficiency of an antenna beam tracking.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A heading and attitude correction method, which is applicable to a heading and attitude correction system, for a vehicle, the method comprising:
   obtaining a plurality of attitude data in any one of axial directions in a period of time from an axial sensor;
   executing a linear regression analysis on the attitude data and a plurality of time points in the time period to generate a regression line and a standard deviation by a calibration circuit;
   processing the attitude data and the regression line using the calibration circuit to determine a deviation value at each of the time points;
   excluding the attitude data for which the deviation value is greater than or equal to at least twice the standard deviation by the calibration circuit;
   grouping the attitude data according to a grouping value to form a plurality of clusters by the calibration circuit;
   digitally matching the clusters based on a total quantity of the attitude data in each of the clusters using the calibration circuit, and selecting one of the clusters with a largest total quantity as an ideal cluster;
   generating, via a pre-programmed logic in the calibration circuit, a reasonable attitude data based on averaging the attitude data in the ideal cluster, and outputting the reasonable attitude data as a control parameter; and
   transmitting the control parameter to a vehicle navigation system to effect a physical adjustment of the vehicle's steering.

2. The heading and attitude correction method according to claim 1, wherein the grouping value is a minimum accuracy of the axial sensor of the heading and attitude correction system.

3. A heading and attitude correction system for a vehicle, comprising:
   an axial sensor configured to sense an attitude of a vehicle to generate a plurality of attitude data in any one of axial directions; and
   a calibration module electrically coupled to the axial sensor, wherein the calibration module executes a heading and attitude correction method including:
      executing a linear regression analysis on the attitude data and a plurality of time points in the time period to generate a regression line and a standard deviation by a calibration circuit;
      processing computing the attitude data and the regression line using the calibration circuit to determine a deviation value at each of the time points;
      excluding the attitude data for which the deviation value is greater than or equal to at least twice the standard deviation by the calibration circuit;
      grouping the attitude data according to a grouping value to form a plurality of clusters by the calibration circuit;
      digitally matching the clusters based on a total quantity of the attitude data in each of the clusters using the calibration circuit, and selecting one of the clusters with a largest total quantity as an ideal cluster;
      generating, via a pre-programmed logic in the calibration circuit, attitude a reasonable attitude data based on averaging the attitude data in the ideal cluster, and outputting the reasonable attitude data as a control parameter; and
      transmitting the control parameter to a vehicle navigation system to effect a physical adjustment of the vehicle's steering.

4. The heading and attitude correction system according to claim 3, wherein the grouping value is a minimum accuracy of the axial sensor of the heading and attitude correction system.

* * * * *